(12) United States Patent
Shimizu

(10) Patent No.: US 12,554,751 B2
(45) Date of Patent: Feb. 17, 2026

(54) KNOWLEDGE EXTRACTING DEVICE AND KNOWLEDGE EXTRACTION METHOD

(71) Applicant: HITACHI, LTD., Tokyo (JP)

(72) Inventor: Yuuki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 303 days.

(21) Appl. No.: 18/185,506

(22) Filed: Mar. 17, 2023

(65) Prior Publication Data

US 2023/0342382 A1 Oct. 26, 2023

(30) Foreign Application Priority Data

Apr. 26, 2022 (JP) ................... 2022-072606

(51) Int. Cl.
*G06F 16/3329* (2025.01)
*G06F 16/31* (2019.01)
*G06F 40/40* (2020.01)

(52) U.S. Cl.
CPC ........ *G06F 16/3329* (2019.01); *G06F 16/322* (2019.01); *G06F 40/40* (2020.01)

(58) Field of Classification Search
CPC ..... G06F 16/3329; G06F 16/322; G06F 40/40
See application file for complete search history.

(56) References Cited

U.S. PATENT DOCUMENTS

| | | | | |
|---|---|---|---|---|
| 5,471,560 A | * | 11/1995 | Allard | G06N 5/022 706/45 |
| 6,868,422 B2 | * | 3/2005 | Turner | G06N 5/022 707/999.102 |
| 8,255,747 B1 | * | 8/2012 | Meinsen | G06F 11/0793 717/124 |
| 10,824,967 B1 | * | 11/2020 | Medina, III | G06Q 10/063 |

(Continued)

FOREIGN PATENT DOCUMENTS

| | | |
|---|---|---|
| JP | 2003-316801 A | 11/2003 |
| JP | 2015-526799 A | 9/2015 |

(Continued)

OTHER PUBLICATIONS

Japanese Office Action received in corresponding Japanese Application No. 2022-072606 dated Nov. 18, 2025.

*Primary Examiner* — Brian L Albertalli
(74) *Attorney, Agent, or Firm* — MATTINGLY & MALUR, PC

(57) ABSTRACT

A knowledge extracting device includes: a question input section which inputs a predetermined question; a question transmitting section which transmits the predetermined question and a new question generated by a question generating section to a respondent terminal; a response acquiring section which acquires a response to a question from the respondent terminal; a question generating section which generates a new question related to the response acquired by the response acquiring section; a relating section which generates, as structured knowledge, a tree structure in which (Continued)

a set of responses acquired by the response acquiring section is associated such that a previously obtained response is a superordinate element of the tree structure and a later obtained response is a subordinate element of the tree structure; and a knowledge output section which outputs the generated structured knowledge as a response to the predetermined question.

13 Claims, 10 Drawing Sheets

(56) References Cited

U.S. PATENT DOCUMENTS

| | | | | |
|---|---|---|---|---|
| 2003/0229527 | A1* | 12/2003 | Fletcher | G06Q 10/10 706/47 |
| 2004/0054693 | A1* | 3/2004 | Bhatnagar | G06Q 30/02 715/705 |
| 2006/0200371 | A1* | 9/2006 | Spector | G06Q 10/06 706/45 |
| 2007/0185900 | A1* | 8/2007 | Gadamsetty | G06F 16/9024 707/999.102 |
| 2009/0171883 | A1* | 7/2009 | Kochunni | G06Q 10/06 706/50 |
| 2009/0293053 | A1* | 11/2009 | Knatcher | G06F 8/61 717/175 |
| 2010/0030712 | A1* | 2/2010 | Passovoy | G06N 5/04 706/11 |
| 2011/0106731 | A1* | 5/2011 | Pearson | G06N 5/04 706/11 |
| 2012/0130934 | A1* | 5/2012 | Brillhart | G06N 5/022 706/46 |
| 2014/0006319 | A1 | 1/2014 | Anand et al. | |
| 2014/0019394 | A1* | 1/2014 | Laxminarayan | G06Q 10/101 706/45 |
| 2014/0129246 | A1* | 5/2014 | Vdovjak | G16H 10/60 705/2 |
| 2017/0161759 | A1* | 6/2017 | Li | G06F 16/3329 |
| 2019/0171726 | A1* | 6/2019 | Ahmed | G06F 16/9535 |
| 2019/0354884 | A1 | 11/2019 | Chino | |
| 2020/0043026 | A1* | 2/2020 | Cruz-Rivera | G06N 5/04 |
| 2020/0335183 | A1* | 10/2020 | Tommasi | G06N 3/006 |
| 2020/0356604 | A1* | 11/2020 | Macdougall | G06N 20/00 |
| 2022/0058707 | A1* | 2/2022 | Herling | G06F 16/951 |
| 2023/0081891 | A1* | 3/2023 | Kulkarni | G06N 3/0455 706/50 |
| 2023/0229680 | A1* | 7/2023 | Verma | G06Q 10/20 |

FOREIGN PATENT DOCUMENTS

| | | |
|---|---|---|
| JP | 2022-41304 A | 3/2022 |
| WO | 2018/097181 A1 | 5/2018 |

* cited by examiner

| No. | NAME | DESTINATION | SPECIALIZATION | YEARS OF WORK EXPERIENCE | PAST RESPONSES |
|---|---|---|---|---|---|
| 1 | RESPONDER A | Xxxxxxx | MACHINERY | 10 | 15 |
| 2 | RESPONDER B | Xxxxxxx | MACHINERY | 2 | 1 |
| 3 | RESPONDER C | Xxxxxxx | COST | 15 | 10 |
| 4 | RESPONDER D | Xxxxxxx | COST | 3 | 2 |
| 5 | : | : | : | : | : |

KNOWLEDGE EXTRACTING DEVICE AND KNOWLEDGE EXTRACTION METHOD

CROSS-REFERENCE TO RELATED APPLICATION

The present application claims priority from Japanese application JP2022-072606, filed on Apr. 26, 2022, the contents of which is hereby incorporated by reference into this application.

BACKGROUND OF THE INVENTION

1. Field of the Invention

The present invention relates to a knowledge extracting device and a knowledge extraction method.

2. Description of the Related Art

Conventionally, in the manufacturing industry, a defect phenomenon occurring in the past and defect information describing a cause thereof have been used to investigate a cause at the time of defect occurrence and to discover examination items at a design stage. However, not all knowledge about defects is described in the defect information, and most of the knowledge exists only in the head of an expert such as a skilled person. Such expert knowledge that is not described in the defect information cannot be utilized until questioning an expert directly.

WO 2018/097181 A describes a knowledge construction and utilization system that transmits a question from a beginner who does not have specialized knowledge to an expert who has specialized knowledge. This knowledge construction and utilization system can present a past response to the next questioner by registering past responses obtained from an expert in a storage means.

SUMMARY OF THE INVENTION

In the method of registering a combination of a question from a beginner and a response obtained from an expert in the knowledge construction and utilization system as in WO 2018/097181 A, only one response can be obtained for one question. Therefore, it is possible that the knowledge that the beginner who wants to investigate the cause of a defect really wants to know cannot be obtained in one response. In addition, when the beginner asks a question again, the beginner needs to generate subsequent questions many times while referring to previous responses and input the subsequent questions into the system. Therefore, labor for the beginner is increased, which is a burden on the beginner.

That is, in the conventional knowledge construction and utilization system, a means of organizing a plurality of causes in relation to each other is not used to efficiently provide complicated specialized knowledge (structured knowledge) to a beginner.

Therefore, a main object of the present invention is to efficiently provide a set of knowledge related to a question.

In order to solve the above problems, a knowledge extracting device according to the present invention has the following features.

The knowledge extracting device according to the present invention includes:
  a question input section configured to input a predetermined question;
  a question transmitting section configured to transmit the predetermined question and a new question generated by a question generating section to a respondent terminal;
  a response acquiring section configured to acquire a response to a question from the respondent terminal;
  the question generating section configured to generate a new question related to the response acquired by the response acquiring section;
  a relating section configured to generate, as structured knowledge, a tree structure in which a set of responses acquired by the response acquiring section is associated such that a previously obtained response is a superordinate element of the tree structure and a later obtained response is a subordinate element of the tree structure; and
  a knowledge output section which outputs the generated structured knowledge as a response to the predetermined question.

Other means will be described later.

According to the present invention, a set of knowledge related to a question can be efficiently provided.

DESCRIPTION OF THE PREFERRED EMBODIMENTS

Hereinafter, each embodiment for implementing the present invention will be described in detail with reference to the accompanying drawings and the like.

First Embodiment

Figure 1:
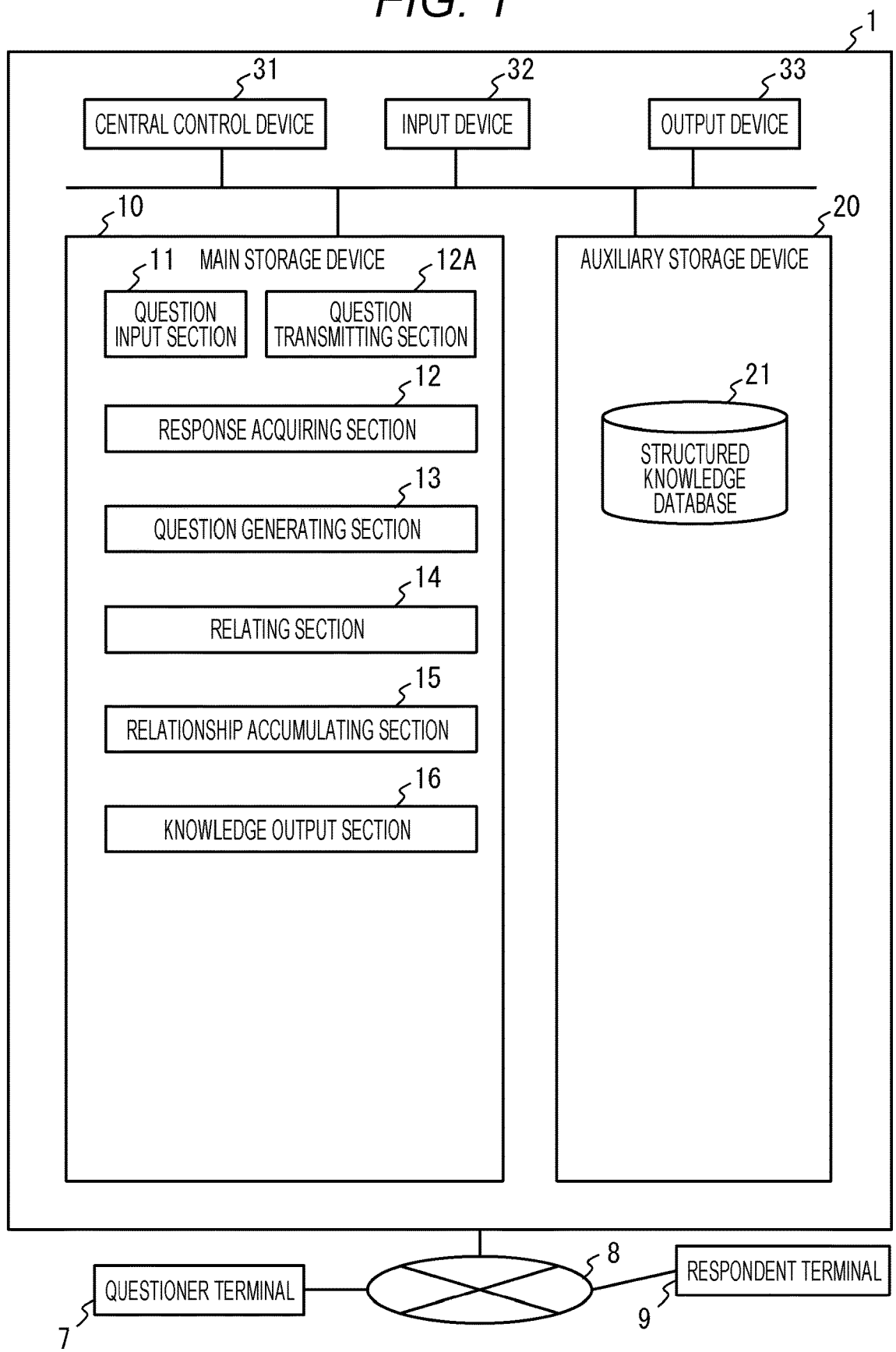
FIG. 1 is a configuration diagram illustrating an example of a knowledge extracting device according to a first embodiment.

FIG. 1 is a configuration diagram illustrating an example of a knowledge extracting device 1 according to a first embodiment.

In addition to a first question of a questioner input to a questioner terminal 7, the knowledge extracting device 1 also transmits other questions (second question, third question, etc.) related to a response (first response) to the question to a respondent terminal 9 based on the first question, and obtains responses (second response, third response, etc.) thereto. The knowledge extracting device 1, the questioner terminal 7, and the respondent terminal 9 can be connected via a network 8.

The respondent terminal 9 receives a response to a question received from the knowledge extracting device 1 from a respondent such as an expert, and returns the response to the knowledge extracting device 1. The knowledge extracting device 1 creates a data structure (FIGS. 2 to 4 for details) called structured knowledge indicating this collective intelligence on the basis of the returned set of responses (first response, second response, third response, etc.), and returns the structured knowledge to the questioner terminal 7.

The knowledge extracting device 1 is a general computer, and includes a central control device 31, an input device 32, an output device 33, a main storage device 10, and an auxiliary storage device 20. The constituent elements of the knowledge extracting device 1 are connected to each other through a bus.

The main storage device 10 stores programs for configuring a question input section 11, a question transmitting section 12A, a response acquiring section 12, a question generating section 13, a relating section 14, a relationship accumulating section 15, and a knowledge output section 16. Hereinafter, when the subject of an operation is referred to as "XX section", the CPU as the central control device 31 reads a respective program from the auxiliary storage device 20 such as a hard disk drive (HDD), loads the program into the main storage device 10, and then implements the function (described later in detail) of the program.

The question input section 11 inputs a first question (predetermined question) of a questioner transmitted from the questioner terminal 7.

The question transmitting section 12A transmits the question input by the question input section 11 and a new question generated by the question generating section 13 to the respondent terminal 9.

The response acquiring section 12 acquires a response to the question transmitted by the question transmitting section 12A from the respondent terminal 9. For example, when the questioner terminal 7 of the questioner asks a first question about "a cause of an event P1", the question input section 11 inputs the first question. Then, the question transmitting section 12A transmits the first question about the "cause of the event P1" to the respondent terminal 9 of the respondent, and the response acquiring section 12 acquires a first response. At this time, the number of respondents who transmit the question may be plural.

The question generating section 13 generates a new question (second question, third question, etc.) related to the response (first response, second response, etc.) acquired by the response acquiring section 12. That is, the question generating section 13 executes processing of acquiring a new response from the response acquiring section 12 by generating another question related to the response acquired by the response acquiring section 12 and transmitting the other question to the respondent terminal 9 via the question transmitting section 12A. The question generating section 13 generates a new question using natural language processing. As a method of generating a new question using natural language processing, for example, a new event may be extracted from the acquired response, and a question about why the extracted new event occurs may be generated. At that time, the question generated by the question generating section 13 is preferably a question of the same quality. A question of the same quality is easier to understand when structured knowledge indicating collective intelligence is presented to a beginner. As used herein, generating questions of the same quality means making the themes or events of the questions the same. For example, if the theme of the first question is content related to cost, the question generated by the question generating section 13 is also preferably a question related to cost.

Furthermore, the knowledge extracting device 1 may include an event data storage section that stores events to be extracted, and may extract a corresponding event from among responses obtained by the response acquiring section 12 and generate a question regarding the extracted new event. In this way, since a new question can be automatically generated, the labor of a beginner or the like can be reduced, and questions can be efficiently generated. In addition, even in a situation where a beginner or the like erroneously recognizes a certain event as a root cause and stops questioning, the question generating section 13 automatically generates a question, so that the event can be more deeply probed.

Figure 8:
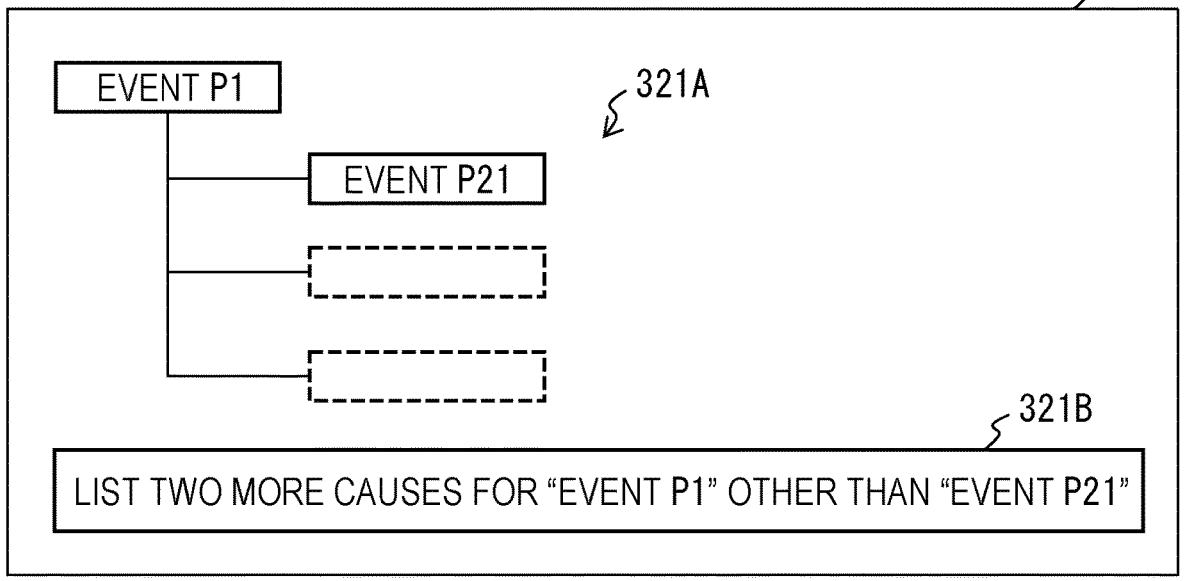
FIG. 8 is a descriptive diagram illustrating an example of structured knowledge including a blank space element for cause discovery as a question to be transmitted to a respondent terminal according to the first embodiment.
Figure 9:
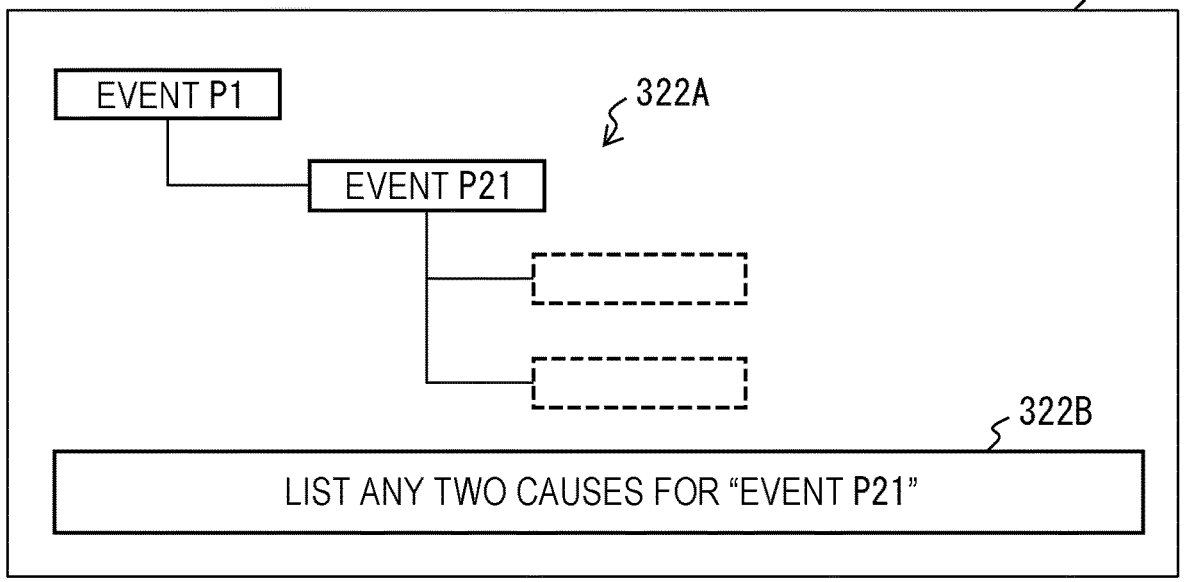
FIG. 9 is a descriptive diagram illustrating an example of structured knowledge including a blank space element for deep probing of a cause as a question to be transmitted to a respondent terminal according to the first embodiment.

Generated new questions include the following examples.
An Xth question to discover other causes in the same hierarchical level as a cause obtained in an Xth response (X=1, 2, 3, etc.) (FIG. 8 for details).
An (X+1)th question for deeply probing causes in lower hierarchical levels of a cause obtained from the Xth response (FIG. 9 for details).

For example, a case will be considered in which a user asks a first question about "the cause of the event P1" and obtains a first response that "the event P1 is caused by the presence of an event P21". In this case, the question generating section 13 generates a second question for deeply probing causes of the "event P21" of the first response acquired this time. That is, the question generating section 13 performs natural language processing on the acquired first response, extracts the event P21 from the first response, and generates a question about why the event P21 occurs.

The question generated by the question generating section 13 is transmitted to the respondent terminal 9 via the question transmitting section 12A, and a response thereto is obtained from the respondent. The obtained response is sent to the question generating section 13 again, and a new related question is generated. The method for generating a new question uses natural language processing as described above. That is, a combination of "acquisition of an Xth response→generation of an (X+1)th question" is repeatedly performed (X=1, 2, 3, etc., recursively), such as "reception and transmission of a first question→acquisition of a first response→generation of a second question→acquisition of a second response→generation of a third response, etc.".

Figure 2:
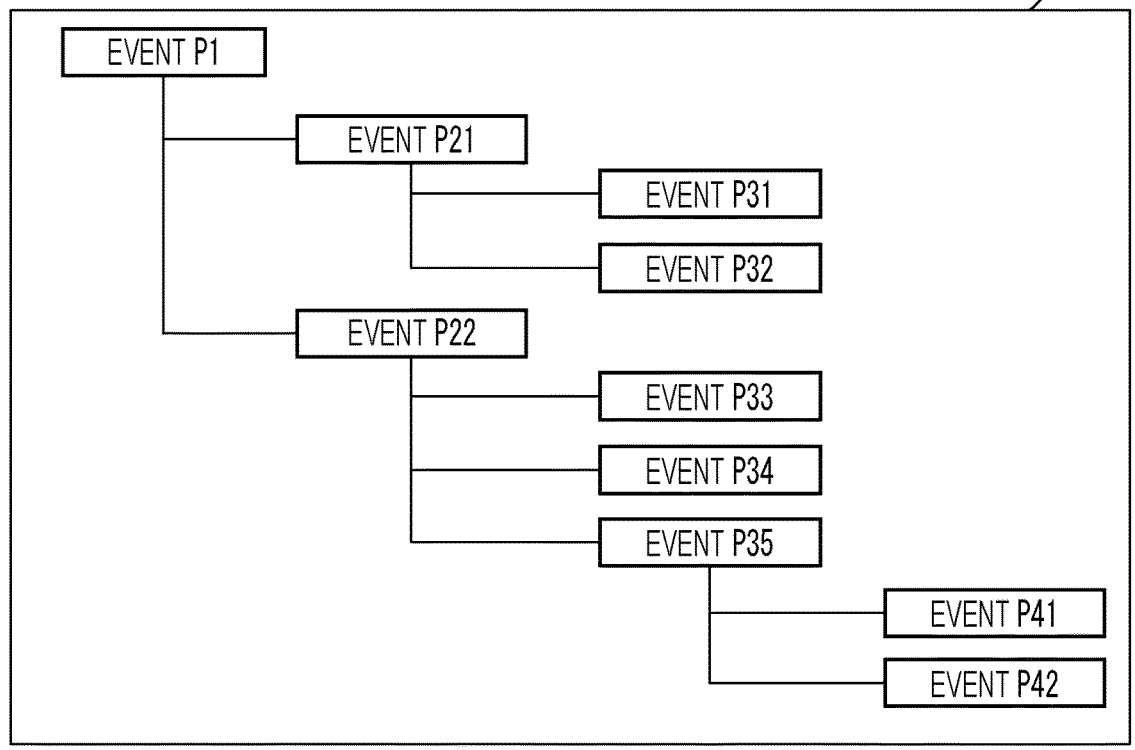
FIG. 2 is a diagram illustrating an example of structured knowledge related to "causes of event P1" obtained by a relating section according to the first embodiment.

The relating section 14 creates structured knowledge as illustrated in FIG. 2 by associating the Xth question transmitted by the question transmitting section 12A with the Xth response received by the response acquiring section 12. In the above example, the relating section 14 creates the structured knowledge by the following procedure.

(Procedure 1) A first response "event P1" obtained from a first question (predetermined question) of the questioner input by the question input section 11 is set as a first response element of a tree structure.

(Procedure 2) A second response "events P21 and P22" obtained from a second question about the cause of the "event P1" acquired in Procedure 1 is set as a second response element of the tree structure.

(Procedure 3) A third response "events P31 to P35" obtained from a third question about the cause of the "events P21 and P22" acquired in Procedure 2 is set as a third response element of the tree structure.

(Procedure 4) A fourth response "events P41 and P42" obtained from a fourth question about the cause of "P35" acquired in Procedure 3 is set as a fourth response element of the tree structure.

(Procedure 5) The relating section 14 creates, as structured knowledge, a tree structure as illustrated in FIG. 2 in which a first response element→a second response element→a third response element→a fourth response element are connected by links in order from the root (first place) of the tree structure.

That is, the relating section 14 generates, as structured knowledge, a tree structure in which a set of responses acquired by the response acquiring section 12 are associated such that a previously obtained response (e.g., the event P21) is a superordinate element of the tree structure and a later obtained response (e.g., the event P31) is a subordinate element of the tree structure.

As a method by which the relating section 14 generates the tree structure, for example, a method of assigning a tag or an ID to a question and a response or a response and a response is considered.

FIG. 2 is a diagram illustrating an example of structured knowledge related to "causes of event P1" obtained by the relating section 14.

Structured knowledge 211 is a tree structure in which a plurality of elements (10 nodes in FIG. 2) is associated (connected by links) by the relating section 14.

The event P1 is an element indicating a first question about a cause of the event P1 input by the questioner, and is a root node of the tree structure. The events P21 and P22 are elements of the first response as to the cause of the event P1. In this way, two first responses may be obtained from one first question.

The events P31 and P32 are second responses to a second question about the cause of the event P21. The events P33, P34, and P35 are second responses to a second question about the cause of the event P22. The events P41 and P42 are third responses to a third question about the cause of the event P35.

Note that each element of the structured knowledge 211 may be an element indicating a question or an element indicating a response.

For example, the element of the event P21 is an element indicating a response in relation to the element of the event P1. At this time, the relating section 14 associates the element of the event P21 indicating a response with the element of the event P1 indicating a question as a subordinate element.

Conversely, the element of the event P21 is an element indicating a question in relation to the element of the event P31. At this time, the relating section 14 associates the element of the event P21 indicating a question with the element of the event P31 indicating a response as a superordinate element.

Returning to FIG. 1, the relationship accumulating section 15 accumulates a combination (a set of responses) of a question transmitted by the question transmitting section 12A and a received response, and the structured knowledge 211 associated by the relating section 14 from the set of responses in a structured knowledge database 21. The structured knowledge 211 in FIG. 2 is an example that is accumulated in the structured knowledge database 21 when the questioner asks a question about the "cause of the event P1".

The knowledge output section 16 outputs the generated structured knowledge 211 to the questioner terminal 7 or the like as a response to the first question (predetermined question).

Figure 3:
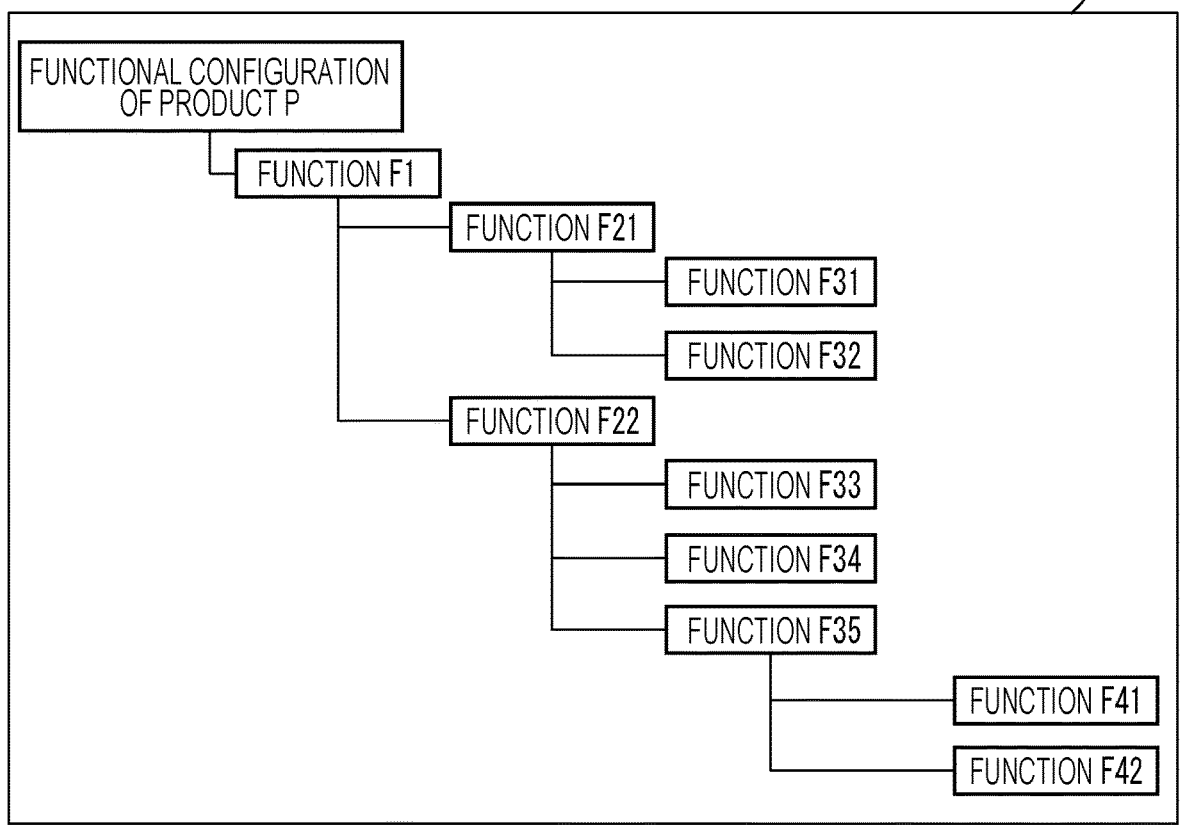
FIG. 3 is a diagram illustrating an example of structured knowledge related to a "functional configuration of a product P" obtained by the relating section according to the first embodiment.

FIG. 3 is a diagram illustrating an example of structured knowledge related to a "functional configuration of a product P" obtained by the relating section 14.

The structured knowledge 212 is generated when the questioner terminal 7 asks a first question about the "functional configuration of the product P". The relating section 14 associates elements of responses collected by the response acquiring section 12 in the order of the first response (function F1)→the second response (functions F21 and F22)→ the third response (functions F31 to F35)→ the fourth response (functions F41 and F42) to generate the structured knowledge 212.

The relationship between the function F1 and the function F21 is the relationship between the main function and the sub function. For example, the response acquiring section 12 transmits a question about the sub-functions constituting the function F1 "hot air function of dryer" to the respondent terminal 9. Then, the response acquiring section 12 acquires the function F21 "heat generation function by heater" and the function F22 "air blowing function to heater" from the respondent terminal 9 as responses to the question about the function F1.

As a result, it is understood that the main function F1 "hot air function of dryer" includes two sub-functions of the function F21 "heat generation function by heater" and the function F22 "air blowing function to heater".

Figure 4:
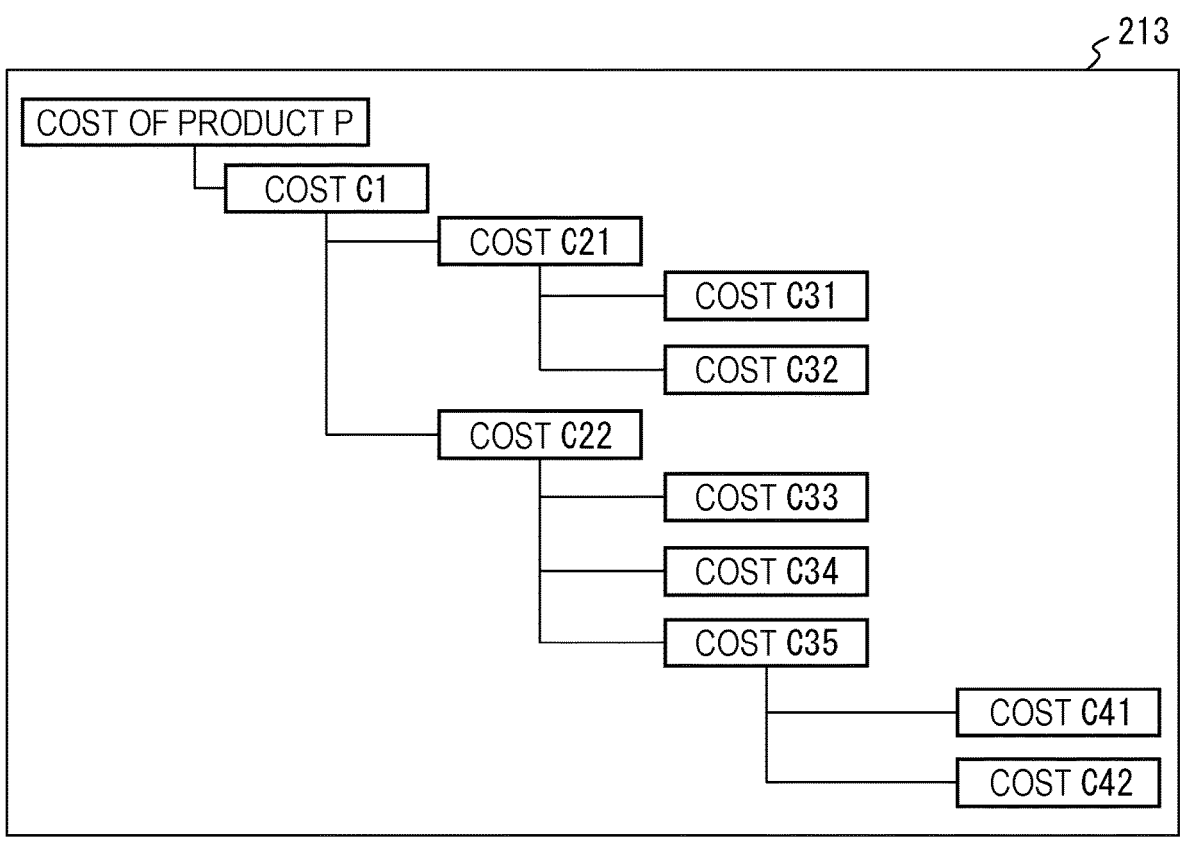
FIG. 4 is a diagram illustrating an example of structured knowledge related to a "cost breakdown of a product P" obtained by the relating section according to the first embodiment.

FIG. 4 is a diagram illustrating an example of structured knowledge related to a "cost breakdown of the product P" obtained by the relating section 14.

Structured knowledge 213 is generated when the questioner terminal 7 asks a first question about the "cost breakdown of the product P". The relating section 14 associates elements of responses collected by the response acquiring section 12 in the order of first response (cost C1)→second response (costs C21 and C22)→ third response (costs C31 to C35)→ fourth response (costs C41 and C42) to generate the structured knowledge 213.

The relationship between the cost C1 and the cost C21 is the relationship between the cost of a main component and the cost of a sub component that is a component of the main component. Alternatively, instead of a sub component, a cost that is not the cost of the component itself, such as the cost of an assembly process, may be included in the structured knowledge 213.

Figure 5:
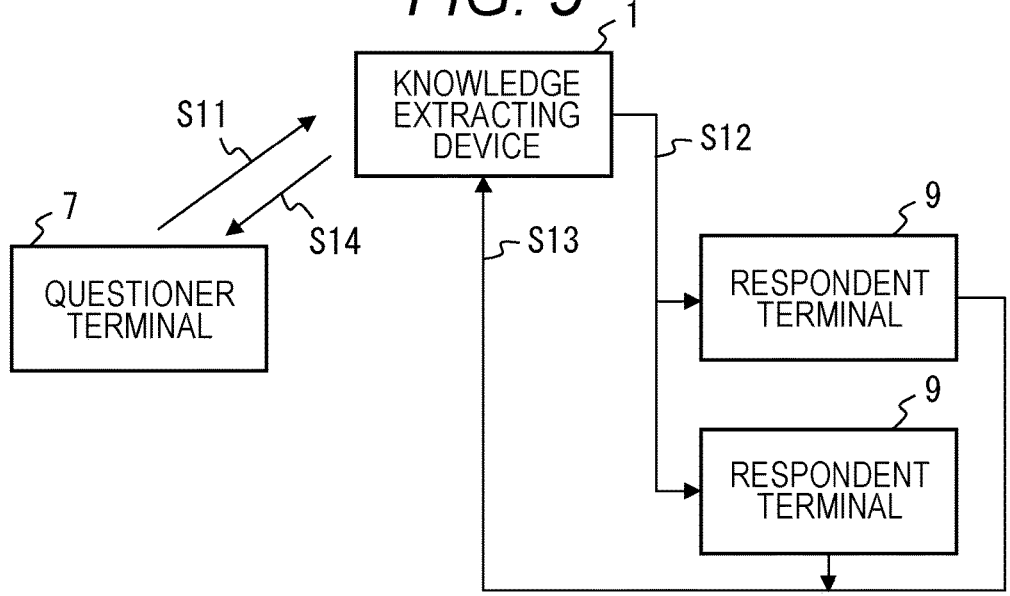
FIG. 5 is a diagram illustrating an example of a configuration of a knowledge processing system according to the first embodiment.

FIG. 5 is a configuration diagram illustrating an example of a knowledge processing system.

The knowledge processing system is configured by connecting the questioner terminal 7, the knowledge extracting device 1, and respondent terminals 9 via a network. The questioner terminal 7 inputs a question such as "What is the cause of event P1?" to the knowledge extracting device 1 (S11).

The knowledge extracting device 1 asks a first question, a second question, etc., and an Nth question related to "What is the cause of event P1?" in S11 to each of the respondent terminals 9 instead of the questioner terminal 7 (S12), and obtains responses thereto (S13). The knowledge extracting device 1 generates structured knowledge in FIG. 2 and the like from the responses obtained in S13, and returns the structured knowledge to the questioner terminal 7 as a response to S11 (S14).

Figure 6:
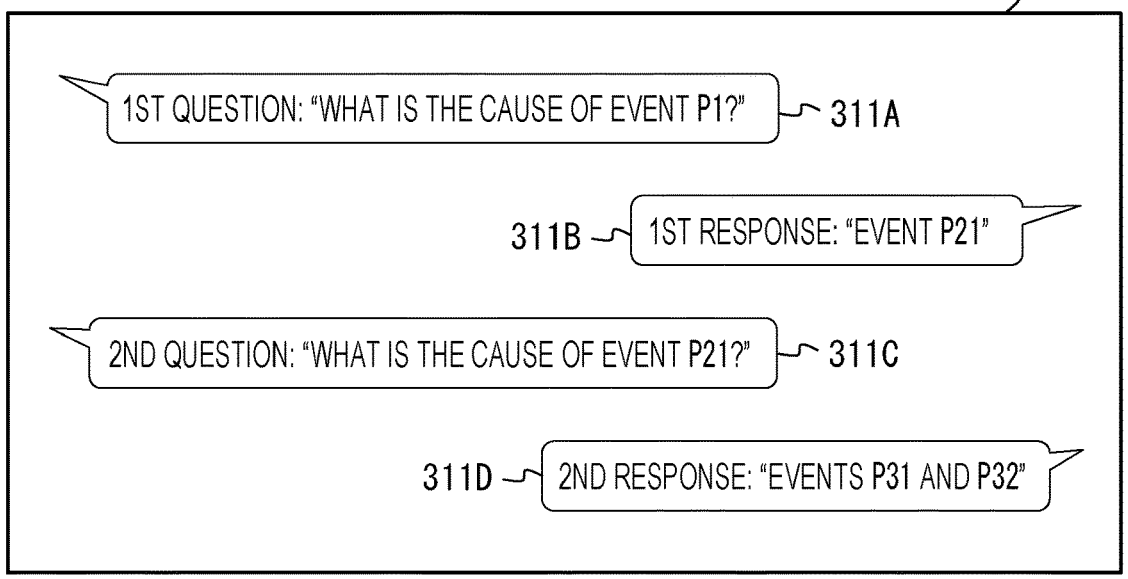
FIG. 6 is a screen diagram illustrating an example of question content exchanged in FIG. 5 according to the first embodiment.
Figure 6:
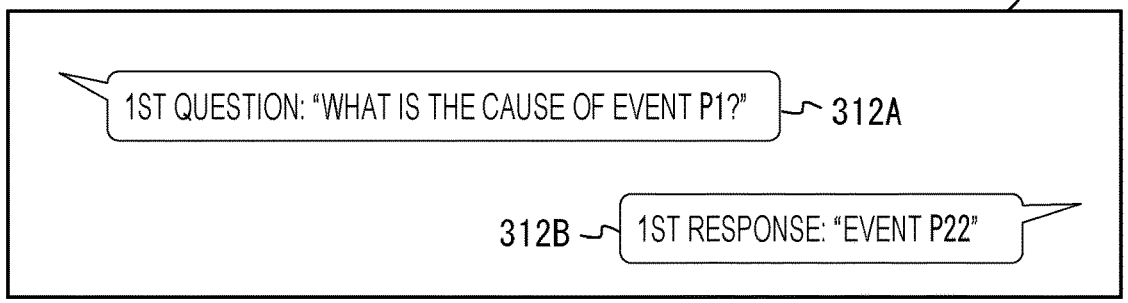

FIG. 6 is a screen diagram illustrating an example of question content exchanged in FIG. 5.

It is assumed that the knowledge extracting device 1 has transmitted the first question related to the "What is the cause of event P1?" input in S11 to each of the first respondent terminal 9 and the second respondent terminal 9.

A combination of a first question 311A and a first response 311B and a combination of a second question 311C and a second response 311D are displayed on a display screen 311 of the first respondent terminal 9. On the display screen 312 of the second respondent terminal 9, a combination of the first question 312A and the first response 312B is displayed.

Figure 7:
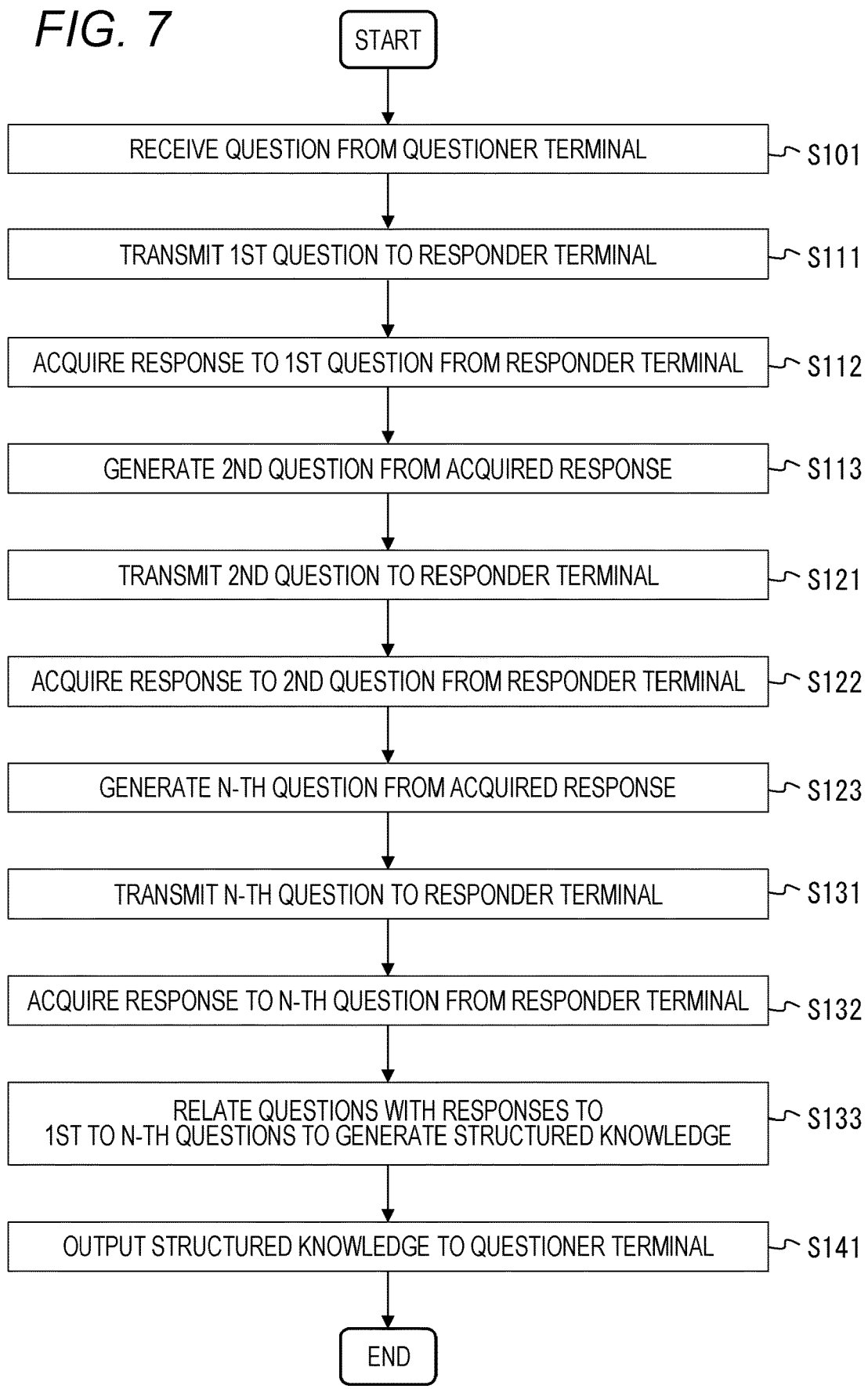
FIG. 7 is a flowchart depicting an example of a processing flow of the knowledge extracting device according to the first embodiment.

FIG. 7 is a flowchart depicting an example of a processing flow of the knowledge extracting device 1.

The question input section 11 of the knowledge extracting device 1 inputs the first question of the questioner input to the questioner terminal 7 (S101, S11 in FIG. 5). The question transmitting section 12A transmits the first question to the respondent terminal 9 (S111), and the response acquiring section 12 acquires a response to the first question from the respondent terminal 9 (S112). The question generating section 13 generates a second question on the basis of the obtained response (S113).

The question transmitting section 12A transmits the second question to the respondent terminal 9 (S121), and the response acquiring section 12 acquires a response to the second question from the respondent terminal 9 (S122). The question generating section 13 generates a Nth question (N=3, 4, etc.) on the basis of the obtained response (S123).

The question transmitting section 12A transmits the Nth question to the respondent terminal 9 (S131), and the response acquiring section 12 acquires a response to the Nth question from the respondent terminal 9 (S132).

The series of processing of the above "question generation, transmission, response" is repeatedly executed while increasing the value of N by one.

The relating section 14 creates structured knowledge by associating the first question made at the beginning from the questioner terminal 7 in S101 with the responses to the first to Nth questions in S111 to S132 as illustrated in FIG. 2 (S133).

The knowledge output section 16 outputs the structured knowledge generated in S133 to the questioner terminal 7 or the like as a response to the first question of S101.

This output processing may be, for example, screen display on the output device 33 such as a display built in or connected to the knowledge extracting device 1. Alternatively, in the output processing from the knowledge output section 16, the structured knowledge may be transmitted to the questioner terminal 7, and the structured knowledge may be stored or displayed on the screen on the questioner terminal 7 side.

FIG. 8 is a descriptive diagram illustrating an example of structured knowledge including a blank space element for cause discovery as a question to be transmitted to the respondent terminal 9.

As indicated by a question sentence 321B asking for two causes of the "event P1" in addition to the "event P21", the question generating section 13 generates a question requesting two subordinate elements differing from the previously responded event P21 as a subordinate element of the event P1. Note that, in the present embodiment, the question sentence "please list two" is generated, but the number is arbitrary.

That is, the question generating section 13 generates, as question data to be transmitted to the question transmitting section 12A, structured knowledge including a superordinate element that has already been questioned, a subordinate element that has already been received as a response to the superordinate element, and a blank space for discovering a subordinate element differing from the subordinate element.

In the tree structure of the structured knowledge 321A, two subordinate elements to be discovered are added as blank spaces (illustrated as wavy line squares).

By transmitting such a question, it is possible to supplement a response even if a respondent has forgotten to respond.

As described above, the tree structure of the structured knowledge 321A and the question sentence 321B are transmitted together to the respondent terminal 9 and displayed, so that the respondent can intuitively read the intention of the question sentence 321B from the tree structure. Therefore, since it is easy for the respondent to recognize the relationship between the events, it is effective to transmit the tree structure and the question sentence together to the respondent terminal 9 in view of facilitating a response by the respondent.

Furthermore, since the structured knowledge 321A also includes a previously obtained response (event P21), it is possible to save labor for the respondent to respond with duplicate response, and to support the idea of the respondent and facilitate responding.

FIG. 9 is a descriptive diagram illustrating an example of structured knowledge including a blank space element for deep probing of a cause as a question to be transmitted to the respondent terminal 9.

As indicated by a question sentence 322B asking for two causes of "event P21", the question generating section 13 generates a question requesting two subordinate elements as a subordinate elements of the event P21. Note that, in the present embodiment, the question sentence "please list two" is generated, but the number is arbitrary.

That is, the question generating section 13 generates, as question data to be transmitted to the question transmitting section 12A, structured knowledge including a superordinate element that has already been responded to, a question for deeply probing a subordinate element of the superordinate element, and a blank space for recording a response to the question for deeply probing. In the tree structure of the structured knowledge 322A, two requested subordinate elements are added as blank spaces (illustrated as wavy line squares).

As described above, the tree structure of the structured knowledge 322A and the question sentence 322B are transmitted together to the respondent terminal 9 and displayed, so that the respondent can intuitively read the intention of the question sentence 322B from the tree structure (overall image) of the structured knowledge.

In addition, by transmitting the structured knowledge 322A including the superordinate element (event P1) of the event P21 to the respondent terminal 9 as a question asking for a subordinate element of the event P21, it is transmitted to the respondent that the premise of the question about the event P21 is the event P1, and response is facilitated.

Second Embodiment

Figure 10:
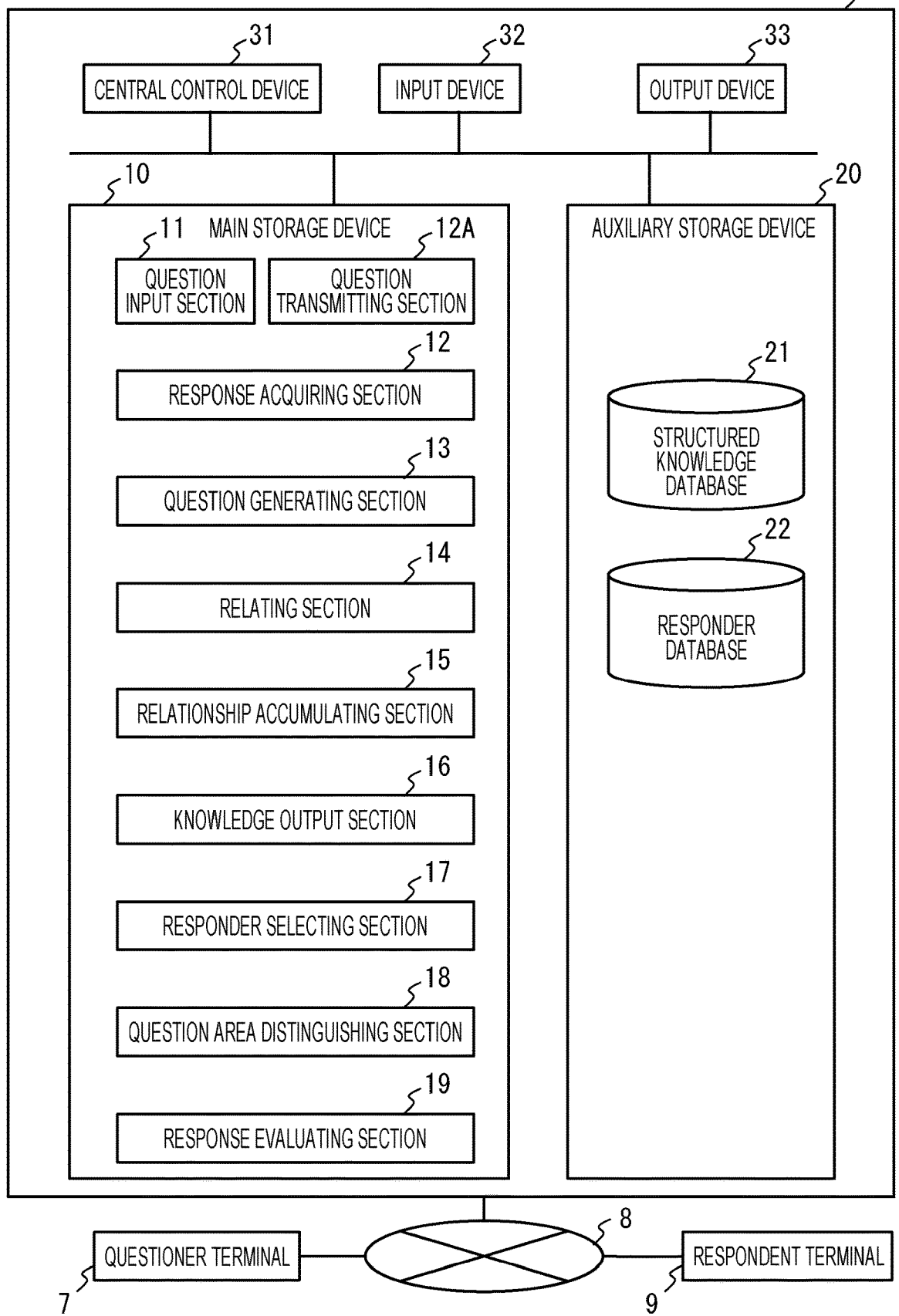
FIG. 10 is a configuration diagram illustrating an example of a knowledge extracting device according to a second embodiment.

FIG. 10 is a configuration diagram illustrating an example of a knowledge extracting device 1 according to a second embodiment. The knowledge extracting device 1 in FIG. 10 includes a respondent selecting section 17, a question area distinguishing section 18, a response evaluating section 19, and a respondent database 22 in addition to the configuration of FIG. 1.

The respondent selecting section 17 enhances the quality of an obtained response by selecting a respondent (respondent terminal 9) to which the question transmitting section 12A is to transmit a question. Therefore, the respondent selecting section 17 compares the content of the question to the suitability of the respondent for the content (suitability for responding to the question) according to each respondent. Note that the respondent database 22 described later with reference to FIG. 11 stores numerical values indicating the suitability of the respondent, such as the number of years of work experience and past response records, in addition to the specialization of the respondent.

The question area distinguishing section 18 discriminates an area (element) in which knowledge is insufficient among the structured knowledge obtained by the relating section 14, and generates another question for the area. The generated question is transmitted to the respondent terminal 9 via the question transmitting section 12A. As a result, knowledge is expanded with respect to the area in which knowledge is insufficient.

The response evaluating section 19 evaluates each obtained response and adds the result for each element of the structured knowledge. The following is an example of evaluation for each response.

(Evaluation 1) "Number of responses" in which the same response result could be obtained when questions were asked to a plurality of respondents (Evaluation 2) "Certainty of response" obtained by weighting the suitability of a respondent in the respondent database 22 with respect to the number or responses in Evaluation 1

Figures 11, 12:
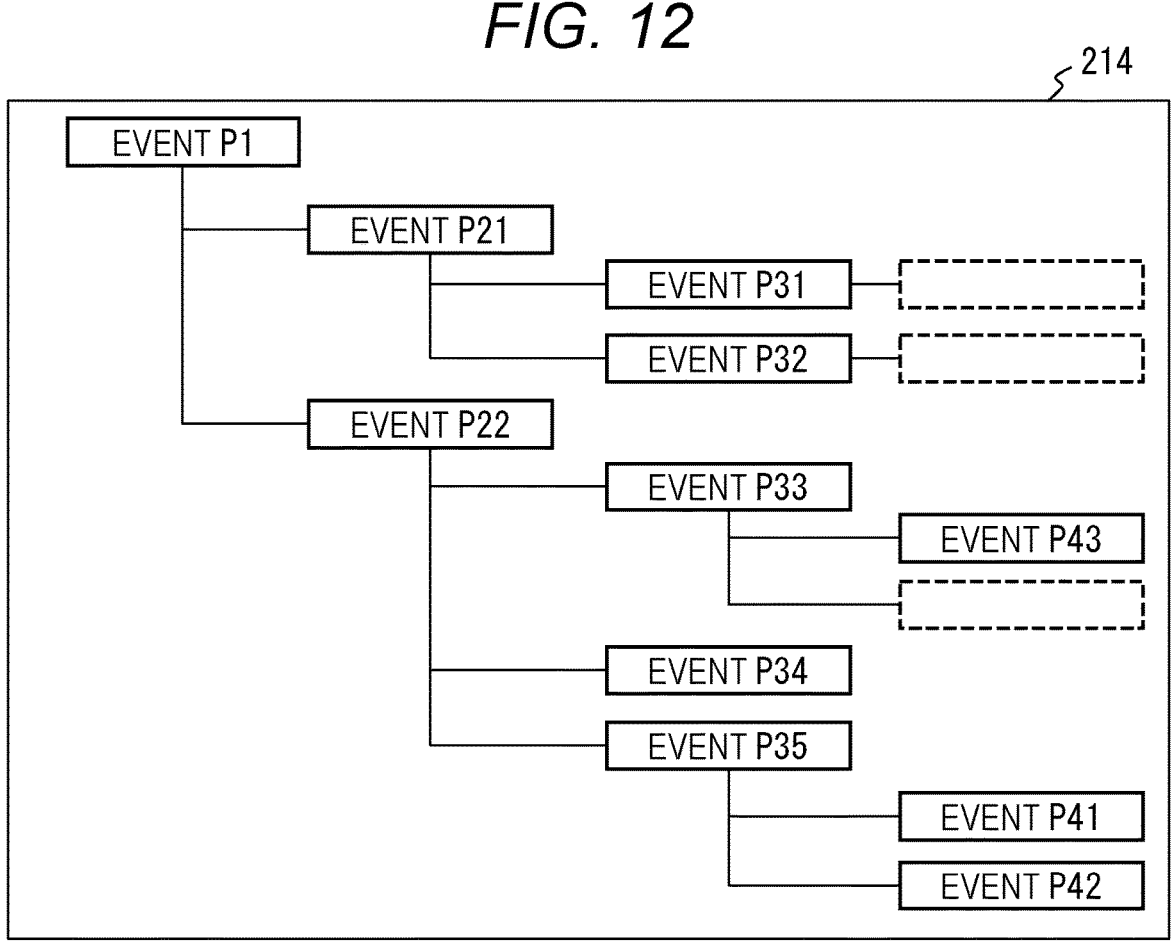
FIG. 11 is a table illustrating an example of a respondent database according to the second embodiment.
FIG. 12 is a descriptive diagram illustrating an example of structured knowledge in which an area having insufficient knowledge is distinguished by a question area distinguishing section according to the second embodiment.

FIG. 11 is a table illustrating an example of the respondent database 22.

The respondent database 22 stores, for each respondent (or respondent candidate), a list in which a respondent identification number (No.) 22A, a respondent name 22B, a destination 22C of a question to the respondent, a respondent specialization 22D, a number of years of work experience 22E of the respondent, and a number of past responses 22F of the respondent are associated with each other.

The respondent selecting section 17 selects a respondent from the respondent database 22. For example, when a question about the cause of a defect of a mechanical component is input to the question input section 11, a respondent A is selected by the following method.

(Procedure 1: Specialization Match) Respondents A and B who match the specialization "machinery" of the question are selected, and respondents C and D who do not match are excluded from the target.

(Procedure 2: Length of Years of Work Experience) The respondent A whose number of years of work experience 22E is longer than that of the respondent B is selected as the remaining respondent candidate in Procedure 1. At this point, the candidates are narrowed down to the respondent A.

(Procedure 3: Large Number of Past Responses) In the example of FIG. 11, this procedure does not need to be performed, but in a case where a plurality of respondents remain through Procedures 1 and 2, the respondent having the largest number of past responses (or top-ranking respondent) is selected from among them.

Note that Procedures 1 to 3 described above are not a limitation, and the respondent selecting section 17 may select a respondent by referring to at least one of the respondent specialization 22D, the number of years of work experience 22E of the respondent, and the number of past responses 22F of the respondent from the respondent database 22. For example, the following selection method is exemplified.

Among the respondent candidates whose specializations match the question, respondents whose years of work experience 22E are longer are preferentially selected. As a result, a highly accurate response can be obtained from a skilled technician.

Among the respondent candidates whose specializations match the question, respondents whose past number of responses 22F is greater are preferentially selected. This increases the probability that a response can be obtained from a respondent who cooperates with question and response.

Among the respondent candidates whose specializations match the question, respondents for whom the product of years of work experience 22E and past number of responses 22F is greater are preferentially selected.

FIG. 12 is a descriptive diagram illustrating an example of structured knowledge in which an area having insufficient knowledge is distinguished by the question area distinguishing section 18.

In a case where a number of elements for which responses have been obtained does not exceed a predetermined threshold among pieces of structured knowledge 214 obtained by the relating section 14, the question area distinguishing section 18 distinguishes an area in which knowledge is insufficient. For example, the question area distinguishing section 18 performs discrimination as follows.

Focusing on the event P33, the direct subordinate element is only one event P43. Therefore, since the number of elements in the same hierarchical level of the event P43 is 1 and corresponds to 1 or less which is a first predetermined threshold value, the event P33 lacks one subordinate element (wavy line square in the drawing).

Focusing on the event P31, there is no direct subordinate element. Therefore, since the number of subordinate elements in a lower hierarchical level to the event P31 is 0 and corresponds to 0 or less which is a second predetermined threshold value, the event P31 lacks one subordinate element (wavy line square in the drawing). Similarly, the event P32 also lacks one subordinate element.

The question generating section 13 receives the result of the question area distinguishing section 18 indicating that the knowledge of the portion illustrated by the wavy line square is insufficient, and generates, as question data to be transmitted to the question transmitting section 12A, structured knowledge in which an element for describing a response in the current question is added as a blank space in FIGS. 8 and 9 with respect to structured knowledge generated by the relating section 14 up to the present time.

Figure 13:
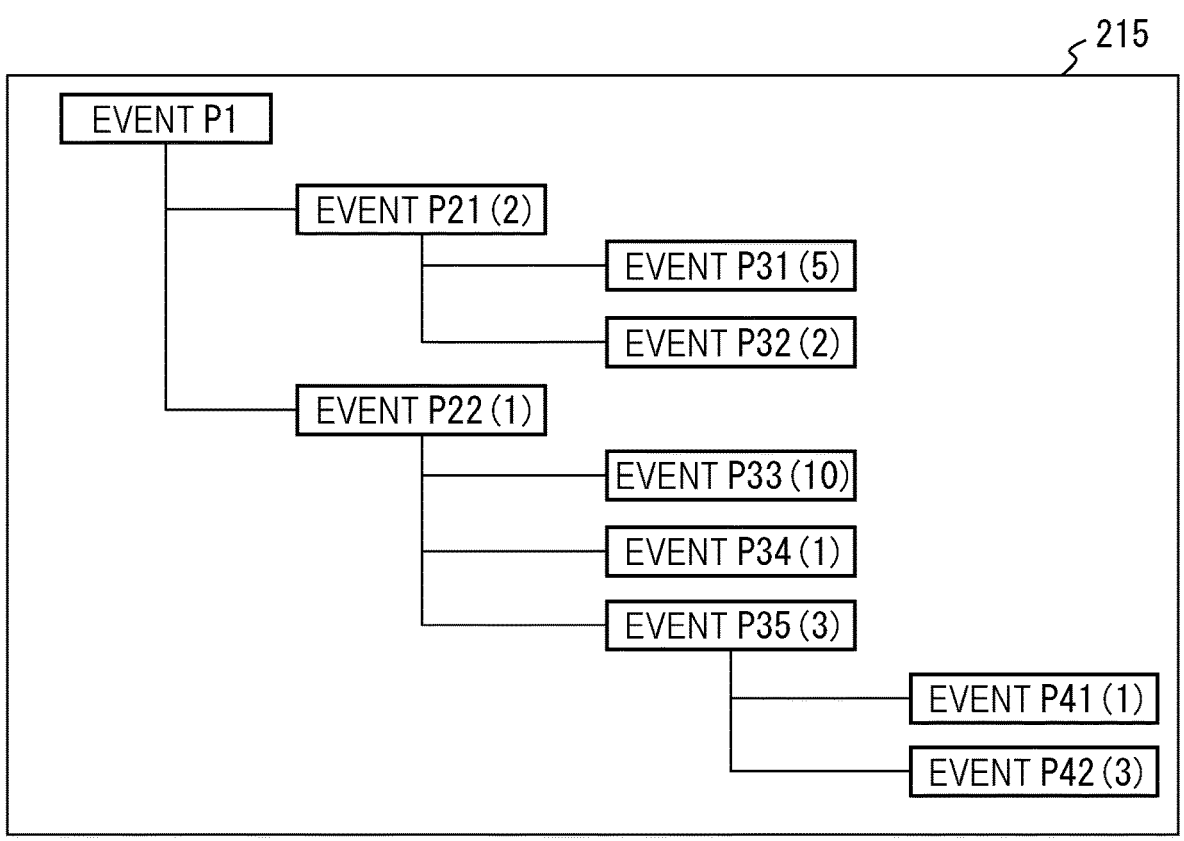
FIG. 13 is a diagram illustrating an example of a display screen of structured knowledge to which an evaluation result is attached by a response evaluating section according to the second embodiment.

FIG. 13 is a diagram illustrating an example of a display screen of structured knowledge to which an evaluation result by the response evaluating section 19 has been attached.

The knowledge output section 16 adds the evaluation result (number of responses or certainty of response) of the response evaluating section 19 described in FIG. 10 to each element of the structured knowledge 215 and outputs the result to the questioner terminal 7. For example, "(2)" after the event P21 indicates that a response of the event P21 has been obtained twice.

Here, even if obtained responses are semantically the same, the expressions may be different. For example, there are "fissures" and "cracks". In such a case, the response acquiring section 12 absorbs such fluctuations in expression by using a synonym dictionary (thesaurus) in which synonyms are defined, and totalizes such fluctuations on the assumption that the same response (e.g., "fissure") has been made a plurality of times.

The response evaluating section 19 may evaluate the certainty of a response in consideration of the suitability of the respondent in the respondent database 22 referred to by the respondent selecting section 17. For example, when the respondent selecting section 17 compares the respondent A and the respondent B in the respondent database 22, the certainty of the response is high from the respondent A for whom both the number of years of work experience 22E and the number of past responses 22F is high.

Therefore, the response evaluating section 19 may weight the suitability of the respondent to the number of responses when calculating the certainty of a response. For example, when the suitability of the respondent A is "10" and the suitability of the respondent B is "8", the response evaluating section 19 calculates the following.

In a case where the respondent A has responded, the suitability "10" x the number of times "1"=the certainty "10" of the response is set.

In a case where the respondent B has responded, the suitability "8" x the number of times "1"=the certainty "8" of the response is set.

The certainty of the response calculated in this manner is added and output as a supplementary explanation of each event, similarly to the number of responses displayed in FIG. 13.

The knowledge extracting device 1 of the present invention described above extracts collective intelligence from a plurality of experts (respondent terminals 9), and generates structured knowledge by deeply probing responses and questions. As a result, the questioner terminal 7 can efficiently acquire structured knowledge indicating a set of knowledge related to a transmitted question.

For example, a questioner who refers to the structured knowledge 215 in FIG. 13 from the questioner terminal 7 can collectively grasp a response to the questioned event P1 (e.g., cooling failure of a refrigerator) as an overall image of the structured knowledge 215. As a result, the event P21 (e.g., a setting error) having a larger number of responses compared to the same hierarchical levels can be handled more preferentially than the event P22 (e.g., the door is not closed).

Furthermore, the questioner can refer to the entire structured knowledge 215 and extract, as an element having a particularly large number of responses, the event P33 (e.g., too much food is packed) as a fundamental cause.

In this manner, the questioner terminal 7 can efficiently acquire structured knowledge as exemplified below from the knowledge extracting device 1.

Figure 14:
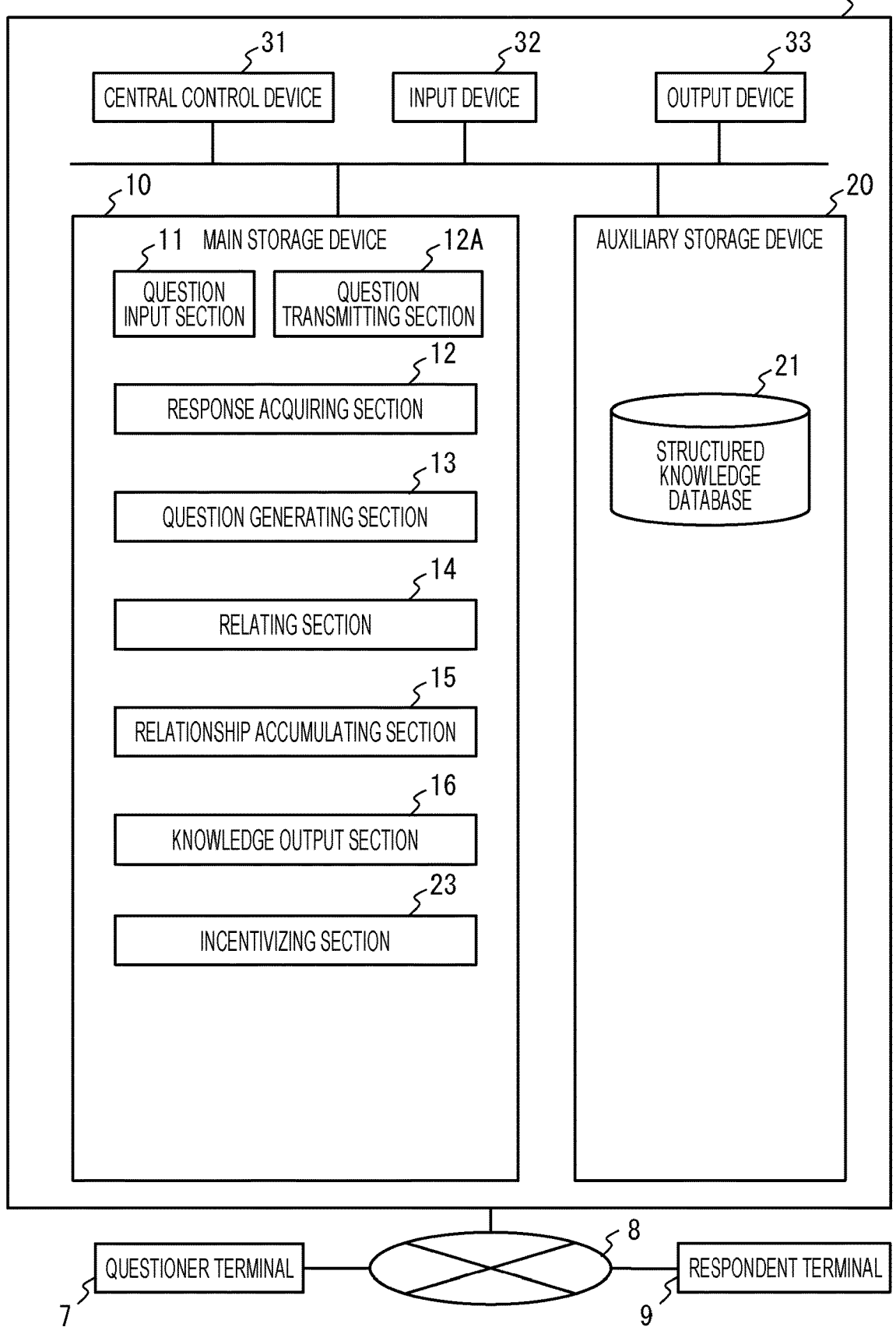

Structured knowledge such as a "fault tree" in which causes of defects are associated with each other in order to investigate causes of defects Functional structured knowledge in which functions of a product are represented in a hierarchical manner, indicating what sub functions are included in the main functions of the product and what functions are included in the sub functions Structured knowledge indicating a product cost breakdown Third Embodiment FIG. 14 is a configuration diagram illustrating an example of a knowledge extracting device 1 according to a third embodiment.

The difference between the knowledge extracting device 1 of the third embodiment and the knowledge extracting device 1 of the first embodiment is that an incentivizing section 23 is added.

The incentivizing section 23 has a function of providing an incentive to a respondent who has responded to the response acquiring section 12 in response to the question from the question transmitting section 12A. Examples of the incentive include money and credibility. By providing an incentive to the respondent, the respondent becomes active in responding to questions, and the knowledge extracting device 1 can efficiently acquire structured knowledge.

Note that the present invention is not limited to the above-described embodiments, and includes various modifications. For example, the above-described embodiments have been described in detail to facilitate understanding of the present invention, and are not necessarily limited to those including all the described configurations.

In addition, a part of the configuration of a certain embodiment can be replaced with the configuration of another embodiment, and the configuration of another embodiment can be added to the configuration of a certain embodiment.

In addition, it is possible to add, delete, and replace other configurations for a part of the configuration of each embodiment. In addition, some or all of the above-described configurations, functions, processing sections, processing means, and the like may be implemented by hardware, for example, by designing with an integrated circuit.

In addition, each of the above-described configurations, functions, and the like may be implemented by software by a processor interpreting and executing a program for implementing each function.

Information such as a program, a table, and a file for implementing each function can be stored in a recording device such as memory, a hard disk, and a solid state drive (SSD), or a recording medium such as an integrated circuit (IC) card, an SD card, and a digital versatile disc (DVD). The cloud can also be utilized.

In addition, control lines and the information lines indicate what is considered to be necessary for description, and do not necessarily indicate all control lines and information lines in a product. In practice, it may be considered that almost all the configurations are connected to each other.

Furthermore, the communication means connecting the respective devices is not limited to a wireless LAN, and may be changed to a wired LAN or other communication means.

What is claimed is:

1. A knowledge extracting device comprising:
a question input section configured to input a predetermined question;
a question transmitting section configured to transmit the predetermined question and a new question generated by a question generating section to a respondent terminal;
a response acquiring section configured to respectively acquire responses to the predetermined question and the new question from the respondent terminal;
the question generating section configured to generate the new question based on the response to the predetermined question acquired by the response acquiring section;
a relating section configured to generate, as structured knowledge, a tree structure in which a set of responses acquired by the response acquiring section is associated such that a previously obtained response is a superordinate element of the tree structure and a later obtained response is a subordinate element of the tree structure; and
a knowledge output section configured to output the generated structured knowledge as a response to the predetermined question,
wherein the question generating section generates, as question data to be transmitted to the response acquiring section, structured knowledge in which an element for describing a response in a current question is added as a blank space to the structured knowledge generated by the relating section up to the present time.

2. The knowledge extracting device according to claim 1,
wherein the relating section generates, as the structured knowledge, the tree structure in which responses are associated such that a response to the predetermined question is a first response element of the tree structure, a response to a new question related to the first response element is a second response element of the tree structure, and a response to a new question related to the second response element is a third response element of the tree structure,
wherein the question generating section generates a new question related to the first response element and a new question related to the second response element, and
wherein the question transmitting section transmits the predetermined question, the new question related to the first response element, and the new question related to the second response element to the respondent terminal.

3. The knowledge extracting device according to claim 1, further comprising:
a relationship accumulating section configured to accumulate, in a structured knowledge database, the set of responses acquired by the response acquiring section and the structured knowledge generated by the relating section.

4. The knowledge extracting device according to claim 1, further comprising:
a respondent database; and
a respondent selecting section,
wherein in the respondent database, a specialization and a number of years of work experience are registered for each respondent candidate, and
wherein the respondent selecting section preferentially selects a respondent with a specialization matching a field of a question and longer years of work experience as a transmission destination to which a question is transmitted by the response acquiring section.

5. The knowledge extracting device according to claim 1, further comprising:
a respondent database; and
a respondent selecting section,
wherein in the respondent database, a record of past responses is registered for each respondent candidate, and
wherein the respondent selecting section preferentially selects a respondent with a longer record of past responses as a transmission destination to which a question is transmitted by the response acquiring section.

6. The knowledge extracting device according to claim 1, further comprising:
a question area distinguishing section configured to distinguish a subordinate element for a predetermined element as a question area in a case where a number of subordinate elements for the predetermined element is equal to or less than a predetermined threshold among elements constituting structured knowledge obtained by the relating section,
wherein the question generating section generates a question for responding to an element of the question area.

7. The knowledge extracting device according to claim 1, further comprising:
a response evaluating section configured to add a number of responses for each response obtained from one or more respondents, to structured knowledge, as an element evaluation result.

8. The knowledge extracting device according to claim 1, further comprising:
a respondent database; and a response evaluating section,
wherein in the respondent database, a numerical value indicating suitability of a respondent is registered for each respondent, and
wherein the response evaluation section calculates certainty of a response on the basis of a number of responses for each response obtained from one or more respondents and suitability of a respondent, and adds the certainty of the response to the structured knowledge as an element evaluation result.

9. The knowledge extracting device according to claim 1,
wherein the question generating section generates, as question data to be transmitted to the response acquiring section, structured knowledge including a superordinate element that has already been questioned, a subordinate element that has already been received as a response to the superordinate element, and a blank space for discovering a subordinate element differing from the subordinate element.

10. The knowledge extracting device according to claim 1,
wherein the question generating section generates, as question data to be transmitted to the response acquiring section, structured knowledge including a superordinate element that has already been responded, a question for deeply probing a subordinate element of the superordinate element, and a blank space for recording a response to the question for the deeply probing.

11. The knowledge extracting device according to claim 1, further comprising:
an incentivizing section configured to provide an incentive to a respondent of the respondent terminal who has responded to the response acquiring section with respect to a question from the question transmitting section.

12. A knowledge extraction method to be implemented by a knowledge extracting device, wherein the knowledge extracting device includes a question input section, a question transmitting section, a response acquiring section, a question generating section, a relating section, and a knowledge output section, the method comprising:

inputting, by the question input section, a predetermined question;

transmitting, by the question transmitting section, the predetermined question and to a respondent terminal;

acquiring, by the response acquiring section, a response to the predetermined question from the respondent terminal;

generating, by the question generating section, a new question based on the response to the predetermined question acquired by the response acquiring section;

transmitting, by the question transmitting section, the new question generated by the question generating section, to the respondent terminal;

acquiring, by the response acquiring section, a response to the new question from the respondent terminal;

generating, by the relating section, as structured knowledge, a tree structure in which a set of responses acquired by the response acquiring section is associated such that a previously obtained response is a superordinate element of the tree structure and a later obtained response is a subordinate element of the tree structure; and outputting, by the knowledge output section, the generated structured knowledge as a response to the predetermined question, wherein the question generating section generates, as question data to be transmitted to the response acquiring section, structured knowledge in which an element for describing a response in a current question is added as a blank space to the structured knowledge generated by the relating section up to the present time.

13. The knowledge extraction method according to claim 12, wherein the relating section generates, as the structured knowledge, the tree structure in which responses are associated such that a response to the predetermined question is a first response element of the tree structure, a response to a new question related to the first response element is a second response element of the tree structure, and a response to a new question related to the second response element is a third response element of the tree structure, wherein the question generating section generates a new question related to the first response element and a new question related to the second response element, and wherein the question transmitting section transmits the predetermined question, the new question related to the first response element, and the new question related to the second response element to the respondent terminal.

* * * * *